United States Patent [19]

Wanie

[11] Patent Number: 4,496,035

[45] Date of Patent: Jan. 29, 1985

[54] NEUTRALIZING MECHANISM FOR A HYDROSTATIC TRANSMISSION

[75] Inventor: Lee J. Wanie, Horicon, Wis.

[73] Assignee: Deere & Company, Moline, Ill.

[21] Appl. No.: 390,148

[22] Filed: Jun. 21, 1982

[51] Int. Cl.³ .............................................. B60K 41/26
[52] U.S. Cl. ...................................... 192/4 C; 74/474; 74/477
[58] Field of Search ...................... 192/4 A, 4 C, 4 R; 74/474, 477, 478, 481, 483 R

[56] References Cited

U.S. PATENT DOCUMENTS

| | | | |
|---|---|---|---|
| 2,665,786 | 1/1954 | Alcock | 192/4 C |
| 2,933,947 | 4/1960 | Shawley et al. | 74/477 |
| 3,157,059 | 11/1964 | Hurst et al. | 74/477 |
| 3,511,105 | 12/1970 | Matter | 74/481 |
| 3,702,648 | 11/1972 | Mori | 192/4 C |

FOREIGN PATENT DOCUMENTS 1230969  5/1971  United Kingdom.
1338992  11/1973  United Kingdom.

*Primary Examiner*—George H. Krizmanich

[57] ABSTRACT

A neutralizing mechanism is provided for moving the control arm of a hydrostatic traction drive transmission and a control lever therefor to their respective neutral positions in response to movement of a traction drive brake pedal toward a brake-engage position. The neutralizing mechanism includes a neutralizing member having abutments for engaging the control arm at locations spaced equidistant from the arm pivot axis.

5 Claims, 3 Drawing Figures

NEUTRALIZING MECHANISM FOR A HYDROSTATIC TRANSMISSION

BACKGROUND OF THE INVENTION

The present invention relates to controls for hydrostatic transmissions and more specifically relates to a mechanism for neutralizing a hydrostatic traction drive transmission in response to actuation of a traction drive brake or clutch.

It is known to interlock manually operable traction drive brake or clutch controls with those for controlling the direction and speed of a hydrostatic traction drive transmission so that the transmission is placed in a neutral condition, and a speed and direction control lever is placed in its neutral position in response to movement of levers for effecting brake engagement or clutch disengagement. One example of such interlocked controls is disclosed in U.S. Pat. No. 3,511,105 granted to Matter on May 12, 1970.

The known interlocked controls suffer from one or more of the drawbacks of being relatively complex, of requiring specially configured cam slots for effecting simultaneous neutralizing of the transmission control arm and control lever and of requiring frequent adjustment of control linkage elements to ensure such simultaneous neutralizing.

SUMMARY OF THE INVENTION

According to the present invention, there is provided an improved control system for neutralizing a hydrostatic traction drive transmission and for positioning a control lever therefor in a corresponding neutral position in response to actuation of a traction drive brake.

An object of the invention is to provide a neutralizing control which is of simple construction and which may be quickly and easily adjusted if necessary.

A more specific object is to provide a neutralizing member which has a pair of abutments positioned for movement into engagement with a transmission control arm at locations on opposite sides of a pivotal connection of the other only when a pedal for actuating the traction brake is depressed.

A further object is to make one of the abutments mentioned in the previous object in the form of a threaded set screw so as to make it adjustable.

These and other objects will become apparent from a reading of the ensuing description together with the appended drawings.

DESCRIPTION OF THE PREFERRED EMBODIMENT

Figure 1:
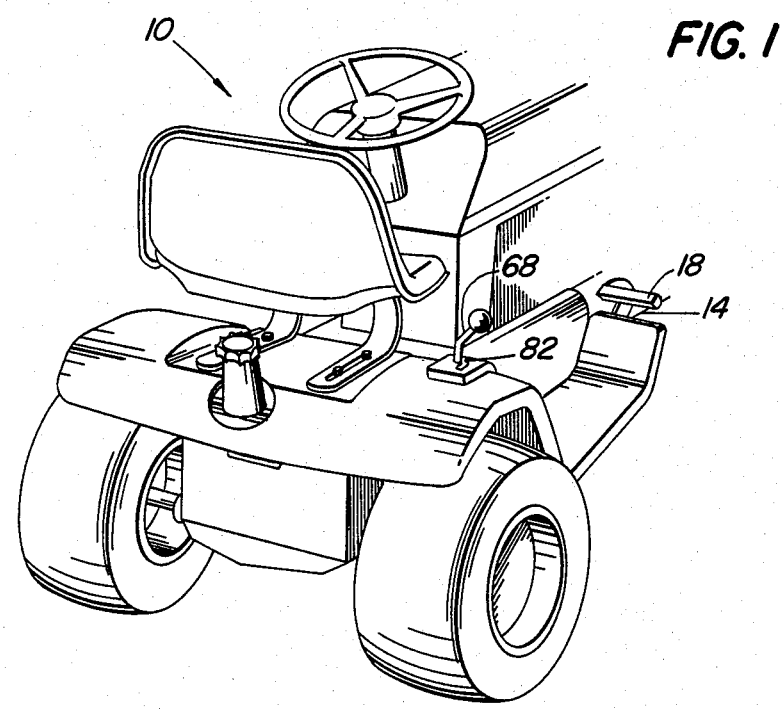
FIG. 1 is a right rear perspective view of a lawn and garden tractor of a type with which a neutralizing mechanism constructed in accordance with the principles of the present invention is particularly adapted for use.

Referring now to FIG. 1, therein is shown a lawn and garden tractor indicated in its entirety by the reference numeral 10. The tractor 10 includes a longitudinally-extending main frame 12 having opposite sides respectively formed in part by transversely-spaced frame members of which only a right-hand frame member 14 is shown. A brake pedal 18 is secured to a right-hand end portion of a transverse crankshaft 20 which is journalled in the channel member 14. An upright arm 22 is secured to the crankshaft 20 at a location spaced leftwardly from the member 14. A brake control rod 26 has a clevis 28 reciprocably received on its forward end in bearing relationship to a pedal-return spring 30 formed by a coil compression spring held on the end of the rod 26 by a cotter key and washer assembly 32. The clevis has the upright arm 22 located between its opposite legs, the latter being provided with a fore-and-aft elongated slot 34 which receives a pin 36 carried by the arm 22. For a purpose to be presently described, the slot 34 is sized so that the pedal 18 may be pivoted clockwise from its illustrated brake-release position to an intermediate position without any motion being transferred to the brake control rod 26; braking action then takes place as the pedal is actuated beyond its intermediate position to its brake-engage position.

Figure 3:
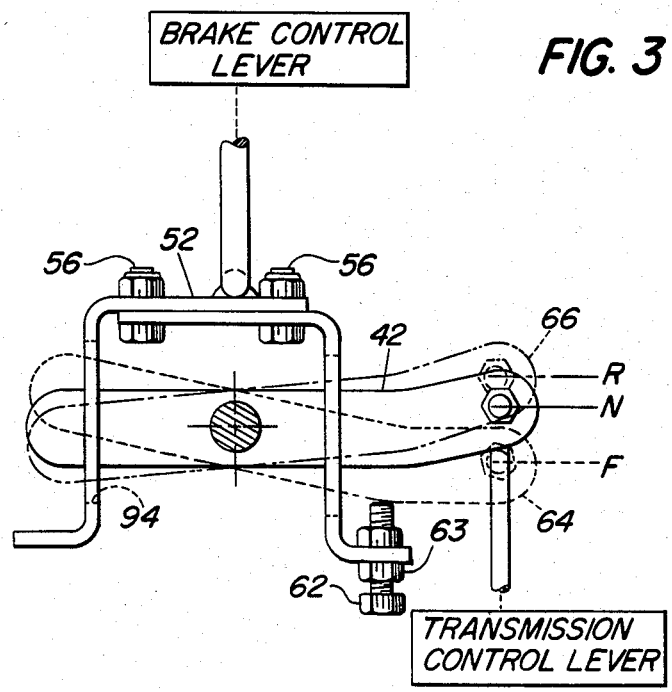
FIG. 3 is a top plan view showing the brake and transmission control input connections with the transmission control lever.

A second upright arm 38 is secured to the crankshaft 20 at a location just leftwardly of the channel member 14. A longitudinally-extending, neutralizing mechanism 40 is connected between the upright arm 38 and a hydrostatic traction drive transmission control arm 42 for moving the lattter to a central neutral position for effecting at least partial neutralization of the transmission in response to movement of the brake pedal 18 from its brake-release to its intermediate position. Specifically, the mechanism 40 includes a fore-and-aft extending rod 44 having a clevis secured to its forward end and pivotally connected to the arm 38 by a pin 46. The rear end of the rod 44 is fixed to a generally U-shaped, neutralizing member 52. The member 52 comprises a pair of identical straps 54 having respective longitudinally-extending, intermediate portions joining respective overlapping forward end portions and respective oppositely extending rearward end portions. The forward end portions are releasably secured together by a pair of bolts 56. The intermediate portions of the pair of straps 54 are respectively provided with a pair of elongate slots or openings 58. The transmission control arm 42 is secured to a transmission control element 59 pivotal about an upright axis y located between the straps 54 and is received for movement within the slots 58. The control arm 42 thus supports the rear end of the neutralizing mechanism. The rearward end portions of the straps 54 are each provided with a hole, and located in one of the holes is an adjustable abutment 62 in the form of a screw received in a nut welded to the associated strap in axial alignment with the hole and held in place by a jam nut 63. When the brake pedal is positioned in its brake-release position as shown, the control arm 42 may be pivoted among a central, neutral position, as shown and various forward and reverse speed positions respectively located on opposite sides of the neutral position without the neutralizing member 40 in any way interfering with such movement, it being noted that extreme forward and reverse speed positions are respectively indicated by the dashed and broken lines illustrated at 64 and 66 in FIG. 3.

For the purpose of being able to selectively place the control arm 42 in a desired position, there is provided an upright, manually operable control lever 68 in the form of a rod and having a downwardly- and forwardly-extending lower end portion fixed to a cylindrical tube 70 which is rotatably mounted on a transverse rod 72 received in the frame member 14 and having its left-hand end supported by a flexible strap 73. Fixed to the tube 70 and extending downwardly and forwardly therefrom is a crank arm 74. A length-adjustable link 76 is connected between the right-hand end of the control arm 42 and the crank arm 74 by means of respective swivel connectors 78 and 80. The lever 68 is mounted for forward movement in a shift slot 82 from a neutral position N to various forward speed positions including a maximum forward speed position F, and for rearward movement in the slot 82 from the neutral position to various reverse speed positions including a maximum rearward speed position R. For the purpose of frictionally maintaining the lever 68 in a selected position, the rod 72 has a coil compression spring 84 acting between a mounting frame member 14 and a washer 86 located against a nut 88 received on the right-hand end of the rod 72. The spring 84 biases the rod 72 rightwardly to frictionally engage a disc of friction material 90, which is located between the strap 73 and the tube 70, against the left-hand end of the tube and to move the tube 70 rightwardly against a second disc of friction material 92.

It is here noted that cooperating with the abutment 62 is a fixed abutment 94 defined by a rear end of that one of the slots 58, which is located in the one of the straps 54 that does not have the abutment 62 associated therewith. The abutments 62 and 94 are located approximately equidistant from the pivot axis of the control arm 42 and serve for engaging the arm 42 and moving it to its neutral position whenever the brake pedal 18 is moved from its brake-release toward its brake-engage position. Specifically, when the control arm 42 is in a selected forward drive position, as shown at 64 in FIG. 3, movement of the pedal 18 toward its brake-engage position will result in the neutralizing member 52 being shifted forwardly so as to first bring the adjustable abutment 62 into engagement with the control arm at a location outwardly of the pivot axis of the latter. Continued movement of the brake pedal will then be transferred to the arm 42 to effect rotation of the latter in the clockwise direction, as viewed in FIG. 3, such rotation continuing until the arm swings into engagement with the abutment 94. At this time the arm 42 should be in its neutral position, and the brake pedal 18 should be in its full brake engagement position. Should it be necessary to move the brake pedal 18 a small amount beyond its full brake engagement position, as when applying or disengaging a park lock mechanism (not shown) for example, this movement will cause substantially equal forces to be applied to the arm 42 at substantially equal distances from its pivot axis and accordingly will not result in further movement of the arm 42. Such movement of the brake pedal is accommodated by the resilient yieldability of the rod 44 of the neutralizing mechanism 40. As explained before, the lost motion slot 34 in the brake control linkage serves to permit the pedal 18 to be rotated to its intermediate position before any of its motion is transferred to apply the brake. Consequently, it will be appreciated that the hydrostatic transmission will be partially neutralized prior to initial engagement of the brake. The pressure built up in the hydrostatic drive once braking begins will provide a force on the pump swash plate which acts in directions tending to neutralize the transmission.

Figure 2:
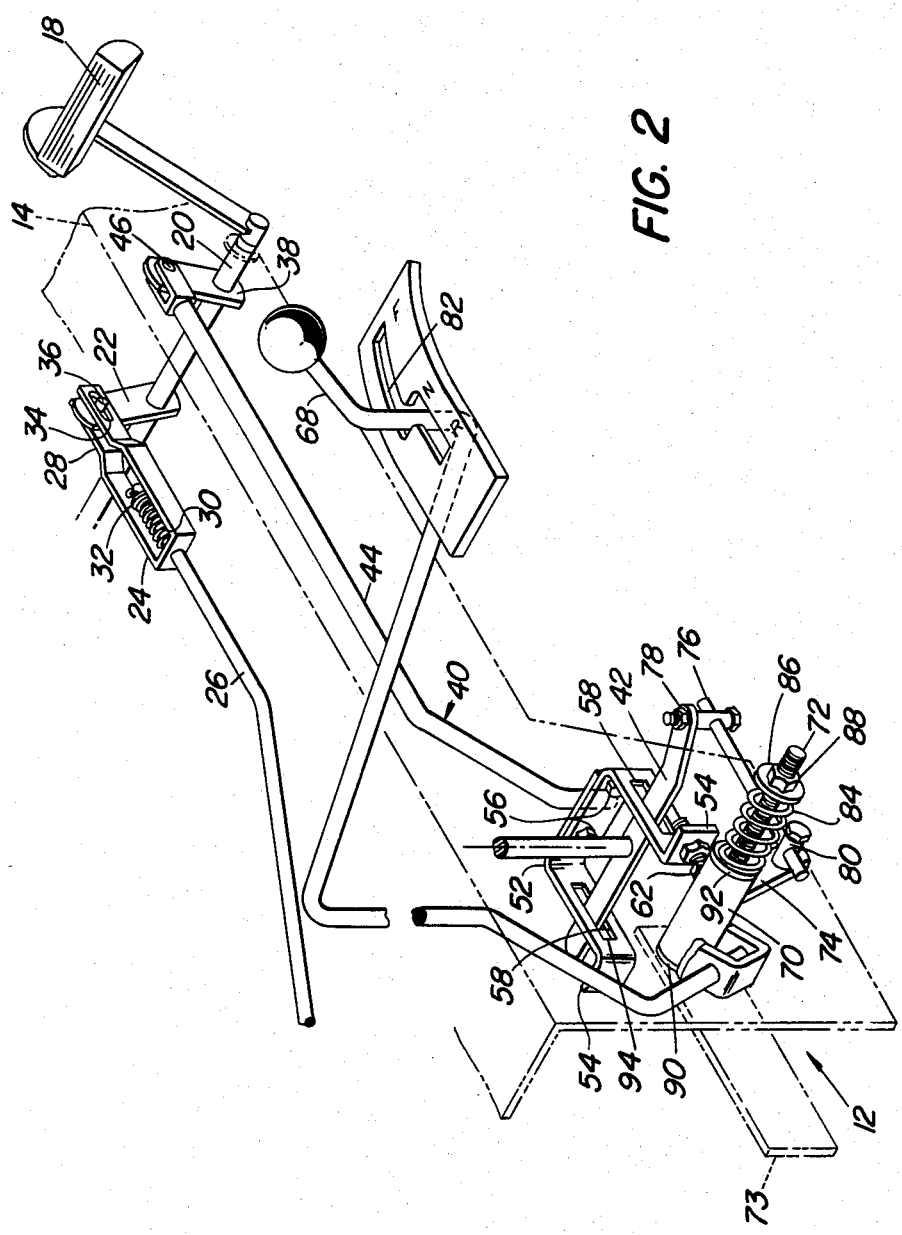
FIG. 2 is a right rear perspective view showing the neutralizing mechanism and its interconnection with the brake control mechanism.

Concurrently with the neutralizing of the control arm 42, the manually-operable control lever 68 is likewise moved to its neutral position when the brake pedal 18 is rotated to its full brake-engagement position. Specifically, as the arm 42 pivots toward its neutral position, it pulls the link 76 forwardly resulting in the tube 70 being rotated counterclockwise, as viewed in FIG. 2, through means of the crank arm 74. As the tube 70 rotates counterclockwise, the lever 68 moves therewith rearwardly from a selected forward drive position to its neutral position.

Movement of the control arm 42 to its neutral position during braking operation when the control arm is initially in a selected reverse drive position is essentially the same as for neutralizing the arm from a selected forward drive position, as discussed above, except that the abutment 94 first engages the arm and rotates the latter into engagement with the adjustable abutment 62.

The purpose for having the abutment 62 be adjustable is to ensure that the control arm 42 reaches its neutral position just as the brakes become fully engaged, and the purpose for having the link 76 adjustable is for ensuring that the control lever 68 and control arm 42 are in their respective neutral positions at the same time. With the abutment 62 and link 76 being in close proximity to each other, they can easily be adjusted from the same location if necessary.

I claim:

1. In a hydrostatic transmission control including a control arm secured to a transmission control element and movable about a pivot axis among a central neutral position and forward and reverse drive positions, respectively, in opposite directions from the neutral position, the improvement comprising: said pivot axis being located intermediate the length of the control arm; a neutralizing member mounted for movement generally crosswise to the length of said arm and including a pair of spaced legs extending in the direction of movement of the member; said legs each being provided with a slot; said arm being positioned in the slots of the legs with the legs being located at opposite sides of the pivot axis of the arm; first and second abutments respectively located on said spaced legs to engage a common surface of the arm at locations on opposite sides of the axis and at least one of the abutments being formed by an end of one of the slots;

said neutralizing member being movable between a disengaged position wherein the abutments are spaced from said arm sufficiently to permit the arm to move freely between extreme forward and reverse drive positions and an engaged position, corresponding to the neutral position of the arm, wherein both abutments are in engagement with the arm; said control including a brake pedal mounted for pivotal movement between brake-release and brake-engage positions; and a brake control linkage connected to said pedal by a lost motion connection and a transmission control linkage being conected between the pedal and the neutralizing member such that the neutralizing member begins movement toward its engaged position before the brake pedal begins to move the brake control linkage.

2. The hydrostatic transmission control defined in claim 1 wherein at least one of the abutments is adjustable in the direction of movement of the neutralizing member relative to the arm for purpose of ensuring that the arm is returned to its neutral position anytime the neutralizing member is moved to its engaged position.

3. The hydrostatic transmission control defined in claim 1 wherein at least one of the legs is provided with an end extending parallel to said surface of the arm; and an adjustable screw being threaded into the end of the leg in the direction of movement of the member and forming one of said abutments.

4. The hydrostatic transmission control defined in claim 1 and further including a manual control lever linked to one end of the arm and mounted for pivotal movement among a central neutral position and various forward and reverse drive positions respectively located in opposite directions from the neutral position to establish the corresponding position in the arm, whereby operation of the neutralizing member from its disengaged to its engaged position will result in the lever being moved to its neutral position.

5. A control system for a traction drive brake and a reversible, variable speed, hydrostatic traction drive transmission comprising: a brake pedal pivotally mounted for movement between brake-release and brake-engage positions; a transmission control arm pivotally mounted for movement, about an axis located between first and second ends of the arm, among a central neutral position and various forward and reverse speed positions at opposite sides of the neutral position; a neutralizing member mounted in the vicinity of the control arm for movement, crosswise to the length of the latter, between arm-release and arm-neutralizing positions; said neutralizing member including first and second abutments located to be free of the arm when the neutralizing member is in its arm-release position and for engaging the arm at respective first and second locations between the first end and the axis and between the second end and the axis and holding the arm in its neutral position when the neutralizing member is in its arm-neutralizing position; a linkage connected between the brake pedal and the neutralizing member for moving the latter toward its arm-neutralizing position during movement of the brake pedal to an intermediate position between the brake-release and brake-engage positions; a manually operable control lever connected to the first end of the control arm for selectively moving the latter among its neutral and various speed positions and for being moved by said arm to a position corresponding to the neutral position of the arm any time the arm is moved to its neutral position by the neutralizing member; and a traction brake control linkage connected to the brake pedal by a lost motion connection which permits the pedal to be moved from its brake-release to its intermediate position without initiating application of a traction brake.

* * * * *